United States Patent
Youst et al.

(10) Patent No.: US 9,729,475 B1
(45) Date of Patent: Aug. 8, 2017

(54) WIRELESS COMMUNICATIONS DEVICE HAVING A DRIVER MODE

(71) Applicants: Donald Ray Youst, Branson, MO (US); Lawrence R. Youst, Dallas, TX (US)

(72) Inventors: Donald Ray Youst, Branson, MO (US); Lawrence R. Youst, Dallas, TX (US)

(*) Notice: Subject to any disclaimer, the term of this patent is extended or adjusted under 35 U.S.C. 154(b) by 0 days.

(21) Appl. No.: 15/479,199

(22) Filed: Apr. 4, 2017

(51) Int. Cl.
| | |
|---|---|
| *H04W 4/00* | (2009.01) |
| *H04L 12/58* | (2006.01) |
| *H04W 4/12* | (2009.01) |
| *H04W 48/04* | (2009.01) |
| *H04W 76/02* | (2009.01) |
| *H04M 1/725* | (2006.01) |

(52) U.S. Cl.
CPC .............. *H04L 51/02* (2013.01); *H04L 51/38* (2013.01); *H04M 1/72552* (2013.01); *H04W 4/12* (2013.01); *H04W 48/04* (2013.01); *H04W 76/023* (2013.01); *H04W 4/008* (2013.01)

(58) Field of Classification Search
CPC .... H04L 51/02; H04L 51/38; H04W 1/72552; H04W 4/12; H04W 76/023; H04W 4/008; G10L 2015/227; G10L 15/22; G06F 3/167; G06F 3/16; H04M 1/236; H04M 1/7253; H04M 1/72552; H04M 1/72577; H04M 1/725
USPC ............. 455/466; 700/94; 345/102; 370/338
See application file for complete search history.

(56) References Cited

U.S. PATENT DOCUMENTS

| | | | | |
|---|---|---|---|---|
| 8,204,649 | B2 * | 6/2012 | Zhou | B60W 50/08 701/36 |
| 8,289,269 | B2 * | 10/2012 | Nanbu | G09G 3/006 345/102 |
| 8,758,127 | B2 * | 6/2014 | Wang | A63F 9/24 463/1 |
| 9,124,720 | B2 * | 9/2015 | West | H04M 1/72552 |
| 9,327,189 | B2 * | 5/2016 | Bavitz | A63F 13/00 |
| 9,450,532 | B2 * | 9/2016 | Tanabe | H02P 29/0241 |

(Continued)

FOREIGN PATENT DOCUMENTS

KR  20130137855 A  * 12/2013

OTHER PUBLICATIONS

Visual-Manual NHTSA Driver Distraction Guidelines for Portable and Aftermarket Devices; National Highway Traffic Safety Administration; Nov. 21, 2016.

(Continued)

*Primary Examiner* — Mahendra Patel
(74) *Attorney, Agent, or Firm* — Lawrence Youst PLLC

(57) ABSTRACT

A cell phone designed to operate in a normal mode and a driver mode. The cell phone includes a memory, a screen, a text entry interface and a processor. The memory is adapted to maintain a driver mode reply message. The cell phone also includes a text-based message system and a driver mode system. The text-based message system is adapted to receive incoming text-based messages and send outgoing text-based messages. The driver mode system is adapted to transition the phone between the normal mode and the driver mode. Responsive to incoming text-based messages from message senders when the phone is in the driver mode, the text-based message system automatically sends the driver mode reply message to the message senders, thereby alleviating the driver's urge to check and reply to the incoming text-based messages.

18 Claims, 3 Drawing Sheets

(56) References Cited

U.S. PATENT DOCUMENTS

| | | | |
|---|---|---|---|
| 2010/0216509 A1* | 8/2010 | Riemer | H04M 1/72577 455/557 |
| 2011/0102146 A1* | 5/2011 | Giron | G01S 13/74 340/7.62 |
| 2011/0177800 A1* | 7/2011 | Gilson | H04W 4/12 455/417 |
| 2012/0058756 A1* | 3/2012 | Olincy | H04M 1/64 455/417 |
| 2012/0064924 A1* | 3/2012 | Schapsis | H04L 51/02 455/466 |
| 2014/0057610 A1* | 2/2014 | Olincy | H04M 3/42365 455/414.1 |
| 2015/0039108 A1* | 2/2015 | Paik | G06F 3/167 700/94 |
| 2015/0330802 A1* | 11/2015 | Ono | B60W 50/14 701/431 |
| 2016/0065722 A1* | 3/2016 | Rose | H04M 1/72569 370/338 |

OTHER PUBLICATIONS

Haskins, Walaika; Bluetooth Device Gags Phone When User Hits the Road; Tech News World; Dec. 15, 2008.

* cited by examiner

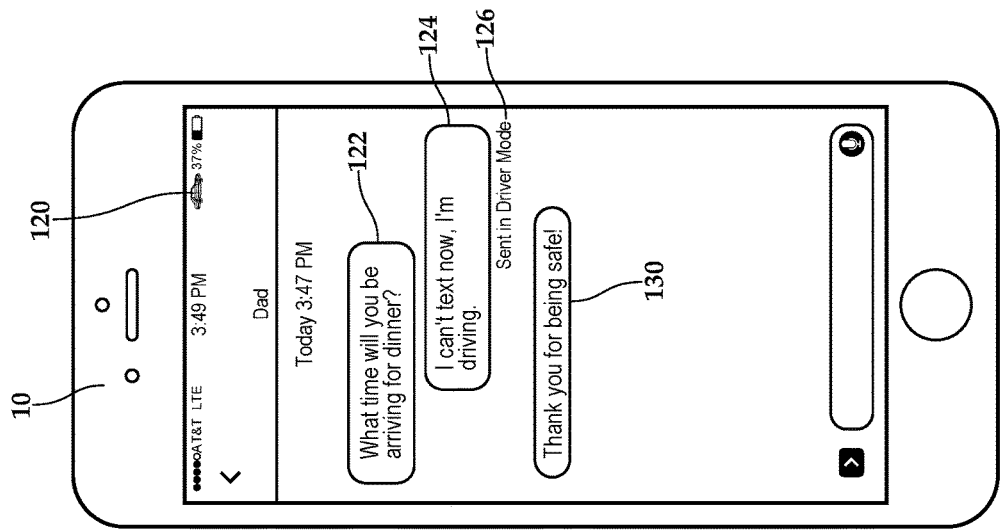
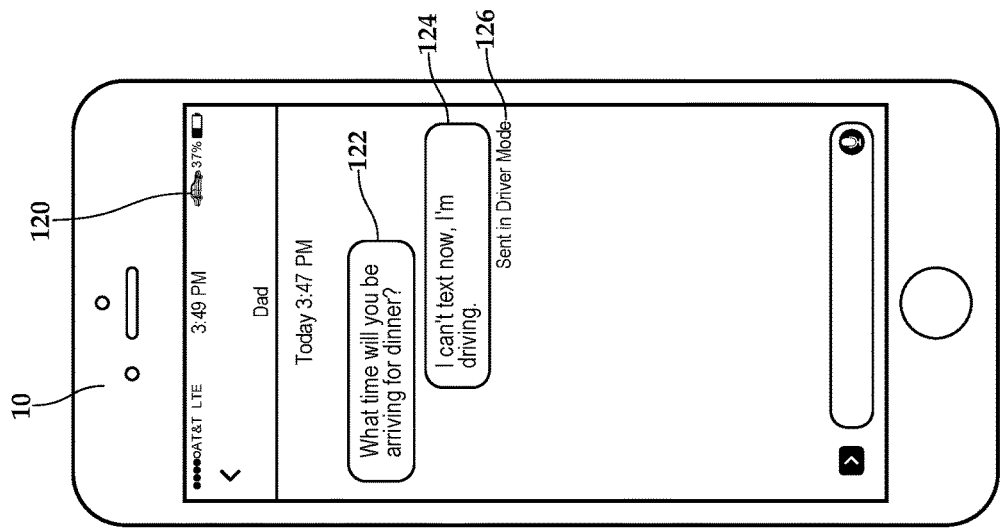
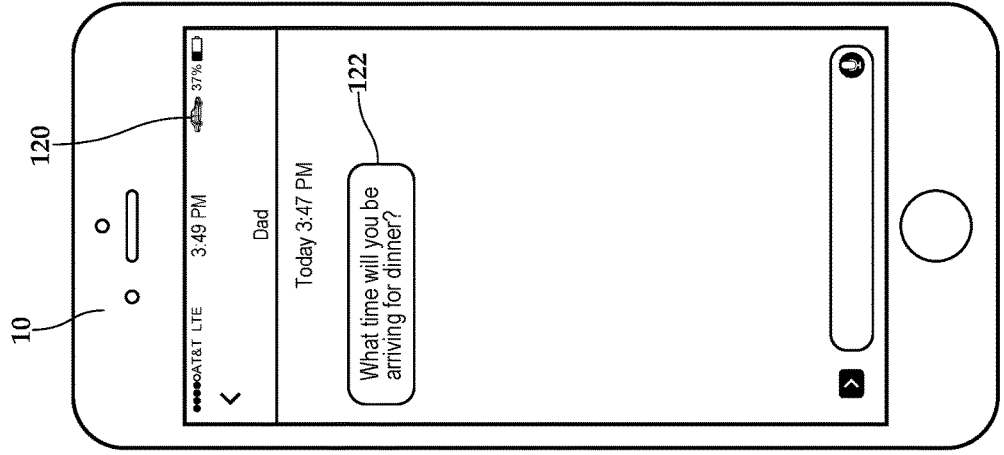

WIRELESS COMMUNICATIONS DEVICE HAVING A DRIVER MODE

TECHNICAL FIELD OF THE DISCLOSURE

The present disclosure relates, in general, to wireless communications devices such as cell phones and, in particular, to a wireless communications device having a driver mode in which a driver mode reply message is automatically sent to message senders responsive to incoming text-based messages, thereby alleviating the driver's urge to check and reply to the incoming text-based messages.

BACKGROUND

Driver distraction is a specific type of inattention that occurs when drivers divert their attention away from the driving task to focus on another activity. The National Highway Traffic Safety Administration (NHTSA) has broadly categorized driver distractions into three types: (1) visual distractions which are tasks that require the driver to look away from the roadway to visually obtain information; (2) manual distractions which are tasks that require the driver to take one or both hands off the steering wheel to manipulate a control, device or other non-driving-related item; and (3) cognitive distractions which are tasks that require the driver to avert their mental attention away from the driving task. Notably, manual text entry into a wireless communications device for the purpose of text-based messaging simultaneously involves all three distraction types and is thus a particularly dangerous activity.

While state laws and consumer information campaigns have sought to reduce driver distractions caused by texting, young people that have grown up with this technology seem compelled to read and obliged to immediately reply to text messages regardless of their surroundings. Proposals have been made to limit the functionality of wireless communications devices used by drivers by locking out certain features that inherently interfere with a driver's ability to safely control a vehicle, such as the manual text entry functionality. While this approach may reduce certain visual-manual interaction with a driver's wireless communications device, it fails to address the cognitive distraction caused by the driver's urge to check and immediately reply to incoming messages. Accordingly, a need has arisen for a wireless communications device having a driver mode that alleviates a driver's urge to check and immediately reply to incoming messages.

SUMMARY

The present disclosure is directed a wireless communications device designed to operate in a normal mode and a driver mode. In the normal mode, a reply message is not automatically sent to message senders responsive to incoming text-based messages. In the driver mode, however, a driver mode reply message is automatically sent to message senders responsive to incoming text-based messages to alleviate a driver's urge to check and immediately reply to incoming text-based messages.

In a first aspect, the present disclosure is directed to a wireless communications device having a normal mode and a driver mode. The device includes a memory adapted to maintain a driver mode reply message. A text-based message system is adapted to receive incoming text-based messages and send outgoing text-based messages. A screen is adapted to display the incoming and outgoing text-based messages. A text entry interface is adapted to receive user input of the outgoing text-based messages. At least one processor is coupled to the memory, the screen and the text entry interface. A driver mode system is adapted to transition the device between the normal mode and the driver mode. Responsive to incoming text-based messages from message senders when the device is in the normal mode, the text-based message system does not automatically send the driver mode reply message to the message senders. Responsive to the incoming text-based messages from message senders when the device is in the driver mode, the text-based message system automatically sends the driver mode reply message to the message senders.

In some embodiments, the device may include a short range communications system operable to pair the device with a vehicle. In such embodiments, the device may transition from the normal mode to the driver mode responsive to pairing the device with the vehicle and the device may transitions from the driver mode to the normal mode responsive to unpairing the device from the vehicle. In certain embodiments, the device may transition between the normal mode and the driver mode responsive to user input. In some embodiments, the device may transition from the normal mode to the driver mode responsive to a predetermined change of location of the device between first and second incoming text-based message notifications. In other embodiments, the device may transition from the normal mode to the driver mode responsive to a predetermined change of location of the device in a predetermined time period after receiving an incoming text-based message.

In certain embodiments, responsive to subsequent incoming text-based messages from a particular message sender during a driver mode session, the text-based message system does not resend the driver mode reply message to the particular message senders. In some embodiments, text-based message notifications may be silenced when the device is in the driver mode. In certain embodiments, the text entry interface may be a virtual keyboard displayed on the screen, a physical keyboard and/or a microphone together with a voice recognition system. In some embodiments, the device may be a smartphone, a cell phone, a personal digital assistant, a tablet computer or similar communications device. In certain embodiments, the incoming and outgoing text-based messages may be text messages, SMS messages, EMS messages, MMS messages, iMessages or similar alphanumeric and/or emoji-based messages.

In a second aspect, the present disclosure is directed to a wireless communications device having a normal mode and a driver mode. The device includes a memory adapted to maintain a driver mode reply message. A text-based message system is adapted to receive incoming text-based messages and send outgoing text-based messages. A short range communications system is operable to pair the device with a vehicle. A touch screen is adapted to display the incoming and outgoing text-based messages and receive user input of the outgoing text-based messages. At least one speaker is operable to generate sounds responsive to incoming text-based messages. At least one processor is coupled to the memory, the short range communications system, the touch screen and the at least one speaker. A driver mode system is adapted to transition the device between the normal mode and the driver mode. The device transitions from the normal mode to the driver mode responsive to pairing the device with the vehicle. Responsive to incoming text-based messages from message senders when the device is in the normal mode, the text-based message system does not automatically send the driver mode reply message to the message senders.

Responsive to the incoming text-based messages from the message senders when the device is in the driver mode, the text-based message system automatically sends the driver mode reply message to the message senders.

In a third aspect, the present disclosure is directed to a cell phone designed to operate in a normal mode and a driver mode, wherein in the normal mode, a driver mode reply message is not automatically sent to message senders responsive to incoming text-based messages and, wherein in the driver mode, the driver mode reply message is automatically sent to the message senders responsive to the incoming text-based messages to alleviate a driver's urge to check and reply to the incoming text-based messages. The phone includes a memory adapted to maintain the driver mode reply message. A text-based message system is adapted to receive the incoming text-based messages and send outgoing text-based messages. A screen is adapted to display the incoming and outgoing text-based messages. A text entry interface is adapted to receive user input of the outgoing text-based messages. At least one processor is coupled to the memory, the screen and the text entry interface. A driver mode system is adapted to transition the phone between the normal mode and the driver mode. Responsive to incoming text-based messages from message senders when the phone is in the normal mode, the text-based message system does not automatically send the driver mode reply message to the message senders. Responsive to incoming text-based messages from message senders when the phone is in the driver mode, the text-based message system automatically sends the driver mode reply message to the message senders, thereby alleviating the driver's urge to check and reply to the incoming text-based message.

In a fourth aspect, the present disclosure is directed to a method of operating a wireless communications device. The method includes maintaining a driver mode reply message in a memory; operating a text-based message system adapted to receive incoming text-based messages and send outgoing text-based messages, displaying the incoming and outgoing text-based messages on a screen; receiving user input of the outgoing text-based messages with a text entry interface; transitioning the device between the normal mode and the driver mode; responsive to incoming text-based messages from message senders when the device is in the normal mode, not automatically sending the driver mode reply message to the message senders and responsive to the incoming text-based messages from the message senders when the device is in the driver mode, automatically sending the driver mode reply message to the message senders.

In a fifth aspect, the present disclosure is directed to a non-transitory computer readable storage medium comprising a set of computer instructions executable by a processor for operating a wireless communications device. The computer instructions are configured to maintain a driver mode reply message in a memory; operate a text-based message system adapted to receive incoming text-based messages and send outgoing text-based messages, display the incoming and outgoing text-based messages on a screen; receive user input of the outgoing text-based messages with a text entry interface; transition the device between the normal mode and the driver mode; responsive to incoming text-based messages from message senders when the device is in the normal mode, not automatically send the driver mode reply message to the message senders and responsive to the incoming text-based messages from the message senders when the device is in the driver mode, automatically send the driver mode reply message to the message senders.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are screen views of a wireless communications device operating in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure.

Figure 1:
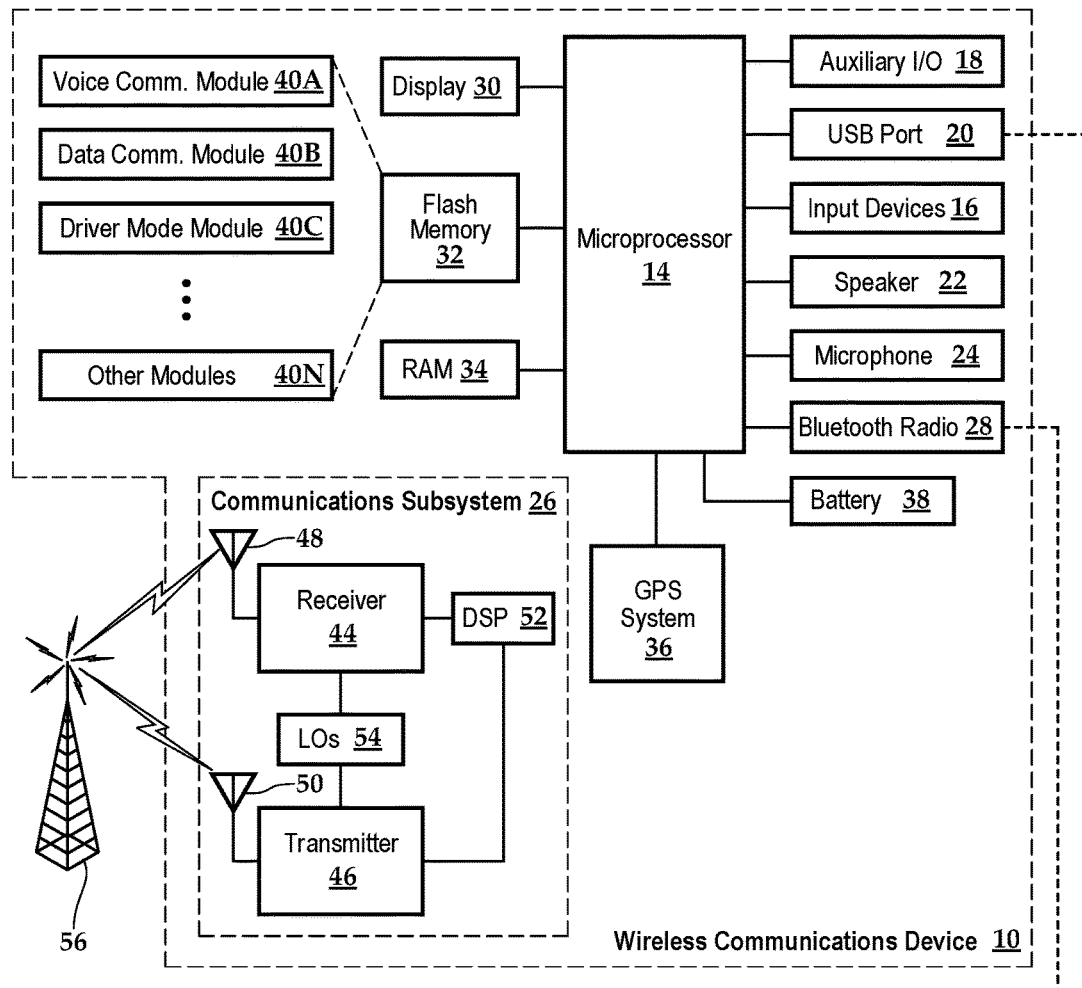
FIG. 1 is a schematic illustration of an exemplary wireless communications device and a vehicle system in accordance with embodiments of the present disclosure.
Figure 1:
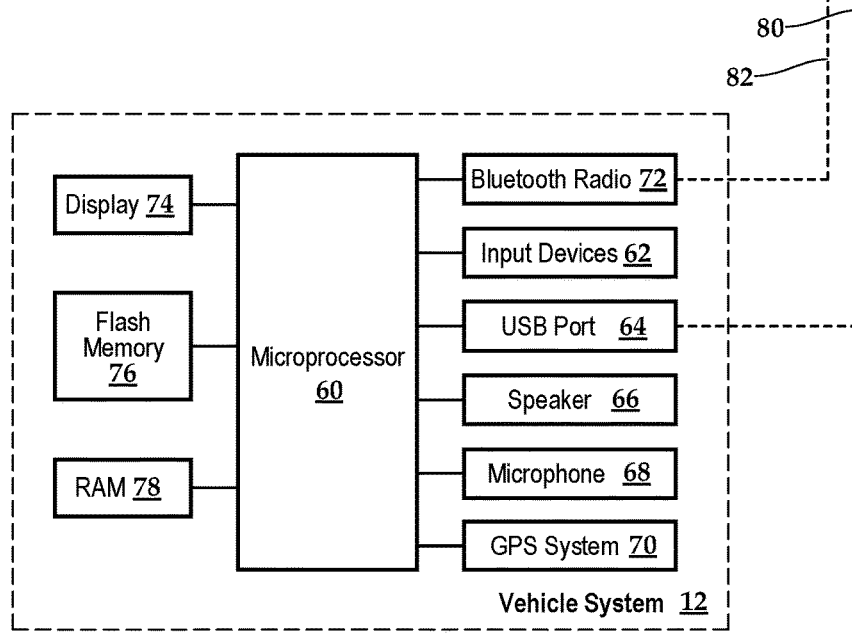
Figure 2:
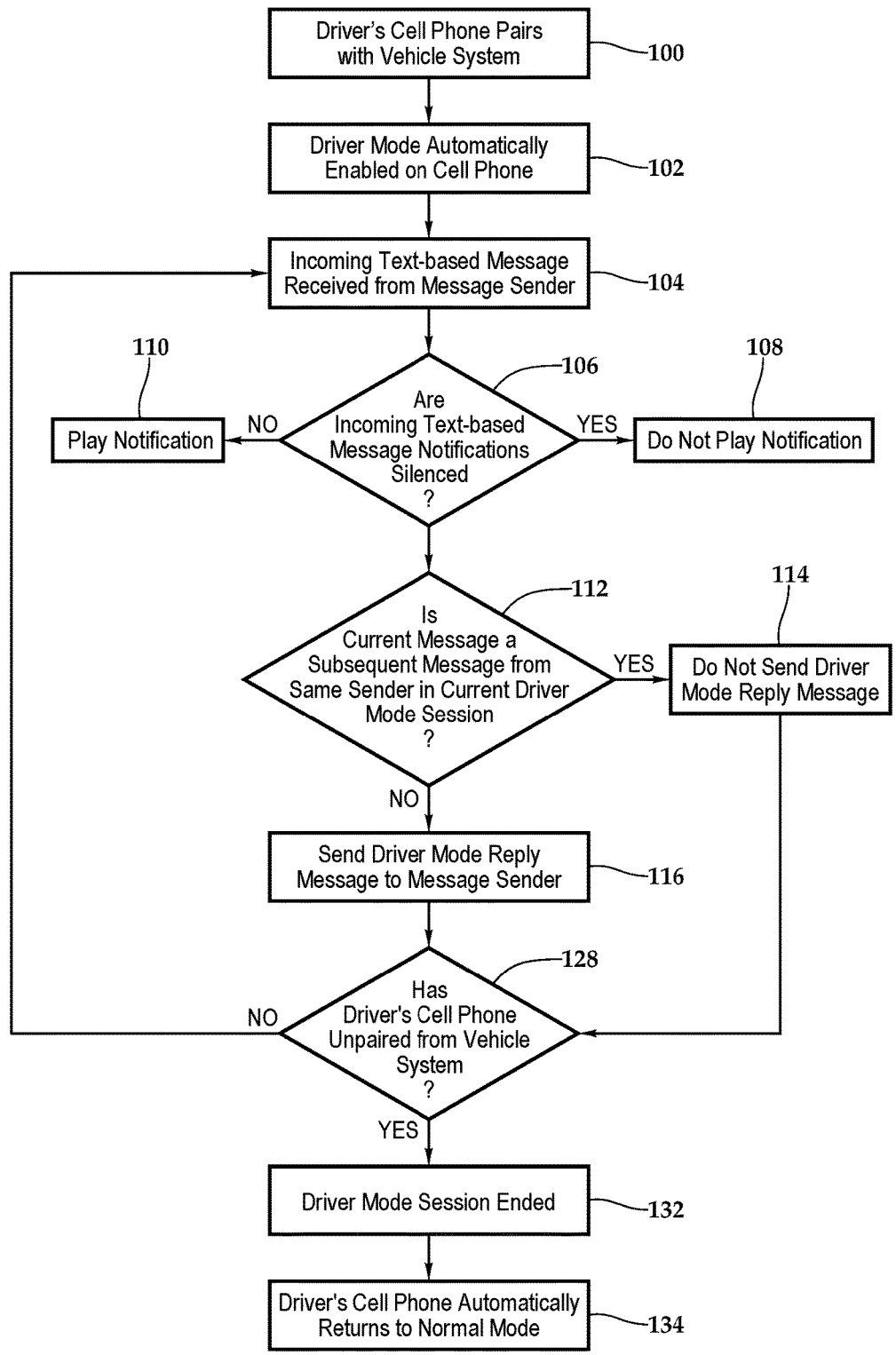
FIG. 2 is a flow diagram illustrating a method of operating a wireless communications device in accordance with embodiments of the present disclosure.

Referring initially to FIG. 1, therein is depicted a wireless communications device 10 such as a smartphone, a cell phone, a personal digital assistant, a tablet computer or other similar computing device and a vehicle system 12 that may be part of the entertainment and/or navigation system of a vehicle such as a automobile, SUV, minivan or truck. Wireless communications device 10 includes a microprocessor 14 that controls the overall operation of device 10 and may be referred to simply as a "processor." Device 10 has a one or more input devices 16 such as an on/off switch, volume buttons, a home button, a touch screen, a physical keyboard and the like. Preferably, in touch screen embodiments, the touch screen is operable to display a text entry interface such as a virtual keyboard. Alternatively or additionally, the text entry interface may include the physical keyboard. In the illustrated embodiment, device 10 has other input/output devices including a set of auxiliary I/O devices 18, a wired interface port depicted as USB port 20, a speaker system 22 and a microphone 24. Device 10 also includes a communications subsystem 26, a short-range communications subsystem depicted a Bluetooth radio 28, a display 30, such as a touch screen display, memory devices depicted as a flash memory 32 and a Random Access Memory (RAM) 34 as well as a location tracking system depicted as GPS system 36. Device 10 further includes a battery 38 to power the active elements of device 10.

Operating system software executed by the microprocessor 14 may be stored in a persistent store, such as flash memory 32 or alternatively may be stored in other types of memory devices, such as a read only memory (ROM) or similar storage element. In addition, system software, device applications or parts thereof, may be temporarily loaded into a volatile store, such as RAM 34. Communication signals received by device 10 may also be stored to RAM 34. Preferably, a user selectable driver mode reply message, such as "I can't text now, I'm driving," a driving emoji or other desired reply message, is stored in flash memory 32 or other suitable memory store.

Microprocessor 14, in addition to performing its operating system functions, executes software applications (computer programs) 40A-40N on device 10. For example, a predetermined set of applications that control basic device operations, such as voice communications module 40A and data communications module 40B, may be installed on device 10 during manufacture. Voice communication module 40A may incorporate a voice recognition engine. Together, the voice recognition engine and microphone 24 may operate as a part of the text entry interface. Data communication module 40B may be part of a text-based message system that is adapted to receive incoming text-based messages and send outgoing text-based messages such as text messages, Short Message Service (SMS) messages, Extended Message Service (EMS) messages, Multimedia Messaging Service (MMS) messages, iMessages or similar alphanumeric and/or emoji-based messages. The text-based message system may communicate with and/or incorporate the one or more text entry interfaces.

Also installed during or after manufacture is a driver mode module 40C that is operable to transition device 10 between a normal mode and a driver mode. As discussed herein, in the normal mode of device 10, a reply message is not automatically sent to message senders responsive to incoming text-based messages. In the driver mode of device 10, however, a driver mode reply message, such as "I can't text now, I'm driving" is automatically sent to a message sender responsive to incoming text-based messages to alleviate the driver of a vehicle from the urge to check and reply to incoming text-based messages. Additional software modules, illustrated as software modules 40N, may also be installed during or after manufacture on device 10.

Wireless communication device 10 may be a two-way RF communication device having voice and data communication capabilities. Communication functions, including data and voice communications, are performed by device 10 through communication subsystem 26 and through Bluetooth radio 28. Communication subsystem 26 includes a receiver 44, a transmitter 46 and one or more antennas 48, 50. In addition, communication subsystem 26 includes a processing module, such as a digital signal processor (DSP) 52 and local oscillators (LOs) 54. The specific design and implementation of communication subsystem 26 is dependent upon the communication network in which device 10 is intended to operate. For example, communication subsystem 26 of device 10 may be designed to operate with the General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless, Universal Mobile Telecommunications Standard (UMTS) and/or fourth generation (4G) wireless. Other types of data and voice networks, such as Wi-Fi networks, may also be utilized with device 10.

When any required network registration or activation procedures have been completed, wireless communications device 10 may send and receive communication signals over communication network 56 including wired and wireless nodes such as base stations and switches. Signals received from communication network 56 by antenna 48 are routed to receiver 44, which provides for signal amplification, frequency down conversion, filtering, channel selection, etc., and may also provide analog-to-digital conversion. Analog-to-digital conversion of the received signal allows DSP 52 to perform more complex communication functions, such as demodulation and decoding. In a similar manner, signals to be transmitted to network 56 are processed (e.g. modulated and encoded) by DSP 52 and are then provided to transmitter 46 for digital-to-analog conversion, frequency up conversion, filtering, amplification and transmission to communication network 56 via antenna 50.

Data communications, such as a received text-based message signal, including text messages, SMS messages, EMS messages, MMS messages, iMessages or the like, are processed by communication subsystem 26 and input to microprocessor 14. The received signal may be further processed, managed and/or handled by data communication module 40B and output to display 30 or alternatively to some other auxiliary I/O device 18. A device user may compose text-based messages, using one of the input devices 16 providing a text entry interface, such as a virtual keyboard or a physical keyboard. Alternatively, microphone 24 and the voice recognition engine may form at least part of the text entry interface. The composed text-based messages may be processed, managed and/or handled by data communication module 40B, then transmitted over communication network 56 via communication subsystem 26.

Voice communications are processes by device 10 substantially similar to data communications, except that the received signals are output to speaker 22 and signals for transmission are generated by microphone 24. Alternative voice or audio I/O subsystems, such as a voice message recording subsystem, may also be implemented on device 10. In addition, display 30 may be utilized in voice communication mode, for example, to display the identity of a calling party, the duration of a voice call or other voice call related information. Bluetooth radio 28 enables communication between and preferably pairing of device 10 with other proximate systems or devices such as vehicle system 12. For example, Bluetooth radio 28 enables short-range communications with similarly-enabled systems and devices.

Vehicle system 12 includes a microprocessor 60 that controls the overall operation of vehicle system 12 and may be referred to simply as a "processor." Vehicle system 12 has one or more input devices 62 such as dials, buttons, a touch screen or the like. In the illustrated embodiment, vehicle system 12 has input/output devices including a wired interface port depicted as USB port 64, a speaker 66 and a microphone 68. Vehicle system 12 includes a location tracking system depicted as GPS system 70, a short-range communications subsystem depicted as Bluetooth radio 72, a display 74, such as a touch screen display, memory devices including a flash memory 76 and a Random Access Memory (RAM) 78 as well as various other device subsystems (not pictured). Vehicle system 12 receives power from the vehicle battery (not pictured).

Operating system software executed by the microprocessor 60 may be stored in a persistent store, such as flash memory 76 or alternatively may be stored in other types of memory devices, such as a read only memory (ROM) or similar storage element. In addition, system software, device applications, or parts thereof, may be temporarily loaded into a volatile store, such as RAM 78. Microprocessor 60, in addition to performing its operating system functions, may execute software applications (computer programs) on vehicle system 12. A predetermined set of applications that control basic system operations may be installed on vehicle system 12 including, for example, a voice communications module including a voice recognition engine to receive user input.

Preferably, device 10 and vehicle system 12 are operable to be paired together using a wired or wireless communications protocol. For example, device 10 and vehicle system 12 may be coupled together manually using a suitable cable such as a USB cable, indicated by dashed line 80 between USB port 20 of device 10 to USB port 64 of vehicle system 12. Alternatively, device 10 and vehicle system 12 may be coupled together automatically using a wireless short-range communications protocol, indicated by dashed line 82 between Bluetooth radio 28 of device 10 and Bluetooth radio 72 of vehicle system 12. Whether using a wired or wireless method, following a suitable software handshake to pair device 10 with vehicle system 12, certain functions of device 10 may be controlled, shared or accessed by vehicle system 12 and/or certain functions of vehicle system 12 may be controlled, shared or accessed by device 10 depending upon the particular implementation. For example, an incoming telephone call received on device 10 may be answered by the user engaging one of the input devices 62 of vehicle system 12. Likewise, voice communication may be process through speaker 66 and microphone 68 of vehicle system 12, while communication with network 56 are processed by communications subsystem 26 of device 10.

Preferably, the pairing of device 10 and vehicle system 12 launches driver mode module 40C such that device 10 automatically transitions from its normal mode, in which a reply message is not automatically sent to message senders responsive to incoming text-based messages, to the driver mode, in which the driver mode reply message is automatically sent to message senders responsive to incoming text-based messages. In this embodiment, the unpairing of device 10 from vehicle system 12 preferably ends the driver mode session of device 10, thereby automatically returning device 10 to its normal mode. Alternatively or additionally, device 10 may be transitioned between the normal mode and the driver mode responsive to user input such as by manually launching driver mode module 40C on device 10. As another alternative, device 10 may automatically transition from the normal mode to the driver mode responsive to a predetermined change in location of device 10 in a predetermined time period, such as a predetermined time period after receiving an incoming text-based message including the time period between a first and a second incoming text-based message notification provided by device 10. The change in location of device 10 may be determined by driver mode module 40C in conjunction with GPS system 36, GPS system 70 or other suitable location tracking system.

Driver mode module 40C may, responsive to a persistent user selection or automatically, implement additional features such as not resending the driver mode reply message to the same message sender responsive to a subsequent incoming text-based message from that message sender during the same driver mode session. Likewise, driver mode module 40C may, responsive to a persistent user selection or automatically, silence incoming text-based message notifications during driver mode sessions to further prevent driver distraction.

Referring now to FIGS. 2 and 3A-3C in the drawings, a flow diagram and screen views illustrating the operation of a wireless communications device in accordance with embodiments of the present disclosure are presented. In block 100 of FIG. 2, the process involves pairing device 10 with vehicle system 12, preferably using a short-range communications protocol such as Bluetooth communications. In block 102, driver mode module 40C is executed on device 10 which starts a driver mode session, as indicated by car icon 120 in FIGS. 3A-3C. Preferably, device 10 automatically launches driver mode module 40C responsive to the pairing of device 10 with vehicle system 12. In block 104, an incoming texted-based message from a message sender is received at device 10. For example, as best seen in FIG. 3A, Dad has sent text message 122 asking "What time will you be arriving for dinner?" In decision 106, it is determined whether, in the current driver mode session, notifications of incoming texted-based messages have been silenced. If notifications of incoming texted-based messages have been silenced, the process branches to block 108 and speaker 22 of device 10 does not emit an audible notification reporting the arrival of the incoming texted-based message. If notifications of incoming texted-based messages have not been silenced, the process branches to block 110 and speaker 22 of device 10 emits an audible notification, such as a text tone, reporting the arrival of the incoming texted-based message.

The process then progresses to decision 112, in which it is determined whether the incoming texted-based message is a second or subsequent incoming texted-based message from the same message sender during the current driver mode session. If the incoming texted-based message is a subsequent incoming texted-based message from the same message sender during the current driver mode session, the process progresses to block 114 and no driver mode reply message is sent. If the incoming texted-based message is the first incoming texted-based message from a message sender during the current driver mode session, as indicated in FIG. 3A, the process progresses to block 116 and the driver mode reply message is automatically sent to the message sender. For example, as best seen in FIG. 3B, device 10 has automatically generated and sent the driver mode reply message 124 to Dad stating "I can't text now, I'm driving." It is noted that when a driver mode reply message is sent to a message sender, a driver reply notice 126 is displayed in the text message display screen. In the illustrated embodiment, driver reply notice 126 reads "Sent in Driver Mode" and is displayed proximate driver mode reply message 124 and in particular, below driver mode reply message 124. Additionally or alternatively, to indicate that a reply message has been automatically sent in the driver mode of device 10, driver mode reply message 124 may be displayed in a different font than non driver mode reply messages, may be displayed in a different color than non driver mode reply messages, may be displayed in a different size than non driver mode reply messages, may be displayed in a bubble having a different color than other sent messages that are non driver mode reply messages and/or may be displayed in a bubble having a different shape than other sent messages that are non driver mode reply messages.

After either block 114 or block 116, the process progresses to decision 128, in which it is determined whether device 10 has unpaired from vehicle system 12. If device 10 has not unpaired from vehicle system 12 and another incoming texted-based message is received, the process returns to block 104. In this case, as indicated in FIG. 3C, Dad has responded to driver mode reply message 124 with text message 130 stating "Thank you for being safe!" Progressing to decision 106, it is determined whether, in the current driver mode session, notifications of incoming texted-based messages have been silenced. If notifications of incoming texted-based messages have been silenced, the process branches to block 108 and speaker 22 of device 10 does not emit an audible notification reporting the arrival of the incoming texted-based message. If notifications of incoming texted-based messages have not been silenced, the process branches to block 110 and speaker 22 of device 10 emits an audible notification, such as a text tone, reporting the arrival of the incoming texted-based message.

The process then progresses to decision 112, in which it is determined whether the incoming texted-based message is a second or subsequent incoming texted-based message from the same message sender during the current driver mode session. In this case, the incoming texted-based message is a subsequent incoming texted-based message from the same message sender during the current driver mode session, thus the process progresses to block 114 and no driver mode reply message is sent. The process progresses to decision 128, in which it is determined whether device 10 has unpaired from vehicle system 12. If device 10 has unpaired from vehicle system 12, the process progresses to block 132 where the current driver mode session is ended. In block 134, device 10 is automatically returned to normal mode, wherein device 10 no longer automatically sends a driver mode reply message to a message sender responsive to the arrival of an incoming text-based message.

Embodiments of methods, systems and program products of the present disclosure have been described herein with reference to drawings. While the drawings illustrate certain details of specific embodiments that implement the methods, systems and program products of the present disclosure, the drawings should not be construed as imposing on the disclosure any limitations that may be present in the drawings. The embodiments described above contemplate methods, systems and program products stored on any non-transitory machine-readable storage media for accomplishing its operations. The embodiments may be implemented using an existing processor or by a special purpose processor incorporated for this or another purpose or by a hardwired system.

Certain embodiments can include program products comprising non-transitory machine-readable storage media for carrying or having machine-executable instructions or data structures stored thereon. Such machine-readable media may be any available media that may be accessed by a general purpose or special purpose processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose processor, special purpose processor or special purpose processing machine to perform a certain function or group of functions.

Embodiments of the present disclosure have been described in the general context of method steps which may be implemented in one embodiment by a program product including machine-executable instructions, such as program code, for example in the form of program modules executed by machines in communication with one another. Generally, program modules include routines, programs, logics, objects, components, data structures, and the like that perform particular tasks or implement particular abstract data types. Machine-executable instructions, associated data structures and program modules represent examples of program code for executing steps of the methods disclosed herein. The particular sequence of such executable instructions or associated data structures represents examples of corresponding acts for implementing the functions described in such steps.

An exemplary implementation of embodiments of methods, systems and program products disclosed herein might include general purpose computing systems in the form of a wireless communications device, including a processing unit, a system memory or database, and a system bus that couples various system components including the system memory to the processing unit. The database or system memory may include read only memory (ROM) and/or random access memory (RAM) on magnetic, optical, solid state or other drives. The drives and their associated machine-readable media provide nonvolatile storage of machine-executable instructions, data structures, program modules and other data.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the present disclosure. Likewise, software implementations of the present disclosure could be accomplished with standard programming techniques using rule based logic and other logic to accomplish the various processes.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wireless communications device having a normal mode and a driver mode, the device operable to be paired with a vehicle, the device comprising:
 a memory adapted to maintain a driver mode reply message;
 a text-based message system adapted to receive incoming text-based messages and send outgoing text-based messages;
 a screen adapted to display the incoming and outgoing text-based messages;

a text entry interface adapted to receive user input of the outgoing text-based messages;
at least one processor coupled to the memory and the screen; and
a driver mode system adapted to transition the device between the normal mode and the driver mode;
wherein, the device automatically transitions from the normal mode to the driver mode responsive to pairing the device with the vehicle;
wherein, responsive to incoming text-based messages from message senders when the device is in the normal mode, the text-based message system does not automatically send the driver mode reply message to the message senders;
wherein, responsive to a first incoming text-based message from a message sender when the device is in the driver mode, the text-based message system automatically sends the driver mode reply message to the message sender;
wherein, responsive to subsequent incoming text-based messages from the message sender during the driver mode session, the text-based message system does not resend the driver mode reply message to the message sender; and
wherein, the device automatically transitions from the driver mode to the normal mode responsive to unpairing the device from the vehicle, thereby ending the driver mode session.

2. The device as recited in claim 1 further comprising a short range communications system operable to pair the device with the vehicle.

3. The device as recited in claim 1 wherein the device is operable to transition between the normal mode and the driver mode responsive to user input.

4. The device as recited in claim 1 wherein text-based message notifications are silenced when the device is in the driver mode.

5. The device as recited in claim 1 wherein the text entry interface is selected from the group consisting of a virtual keyboard displayed on the screen, a keyboard and a microphone in combination with a voice recognition system.

6. The device as recited in claim 1 wherein the device is selected from the group consisting of smartphones, cell phones, personal digital assistants and tablet computers.

7. The device as recited in claim 1 wherein the incoming and outgoing text-based messages further comprise at least one of text messages, SMS messages, EMS messages, MMS messages and iMessages.

8. A wireless communications device having a normal mode and a driver mode, the device operable to be paired with a vehicle, the device comprising:
a memory adapted to maintain a driver mode reply message;
a text-based message system adapted to receive incoming text-based messages and send outgoing text-based messages;
a short range communications system operable to pair the device with the vehicle;
a touch screen adapted to display the incoming and outgoing text-based messages and receive user input of the outgoing text-based messages;
at least one speaker operable to generate sounds responsive to incoming text-based messages;
at least one processor coupled to the memory, the short range communications system, the touch screen and the at least one speaker; and
a driver mode system adapted to transition the device between the normal mode and the driver mode;
wherein, the device automatically transitions from the normal mode to the driver mode responsive to pairing the device with the vehicle;
wherein, responsive to incoming text-based messages from message senders when the device is in the normal mode, the text-based message system does not automatically send the driver mode reply message to the message senders;
wherein, responsive to a first incoming text-based message from a message sender when the device is in the driver mode, the text-based message system automatically sends the driver mode reply message to the message sender;
wherein, responsive to subsequent incoming text-based messages from the message sender during a driver mode session, the text-based message system does not resend the driver mode reply message to the message sender; and
wherein, the device automatically transitions from the driver mode to the normal mode responsive to unpairing the device from the vehicle, thereby ending the driver mode session.

9. The device as recited in claim 8 wherein the device is selected from the group consisting of smartphones, cell phones, personal digital assistants and tablet computers.

10. The device as recited in claim 8 wherein the incoming and outgoing text-based messages further comprise at least one of text messages, SMS messages, EMS messages, MMS messages and iMessages.

11. A cell phone designed to operate in a normal mode and a driver mode, in the normal mode, a driver mode reply message is not automatically sent to a message sender responsive to incoming text-based messages and, in the driver mode, the driver mode reply message is automatically sent to the message sender responsive to the incoming text-based messages to alleviate a driver's urge to check and reply to the incoming text-based messages, the phone operable to be paired with a vehicle, the phone comprising:
a memory adapted to maintain the driver mode reply message;
a text-based message system adapted to receive the incoming text-based messages and send outgoing text-based messages;
a screen adapted to display the incoming and outgoing text-based messages;
a text entry interface adapted to receive user input of the outgoing text-based messages;
at least one processor coupled to the memory and the screen; and
a driver mode system adapted to transition the phone between the normal mode and the driver mode;
wherein, the phone automatically transitions from the normal mode to the driver mode responsive to pairing the phone with the vehicle;
wherein, responsive to the incoming text-based messages from the message senders when the phone is in the normal mode, the text-based message system does not automatically send the driver mode reply message to the message senders;
wherein, responsive to a first incoming text-based messages from a message sender when the phone is in the driver mode, the text-based message system automatically sends the driver mode reply message to the message sender;

wherein, responsive to subsequent incoming text-based messages from the message sender during a driver mode session, the text-based message system does not resend the driver mode reply message to the message sender; and wherein, the device automatically transitions from the driver mode to the normal mode responsive to unpairing the device from the vehicle, thereby ending the driver mode session.

12. The phone as recited in claim 11 further comprising a short range communications system operable to pair the phone with the vehicle.

13. The phone as recited in claim 11 wherein text-based message notifications are silenced when the device is in the driver mode.

14. The phone as recited in claim 11 wherein the incoming and outgoing text-based messages further comprise at least one of text messages, SMS messages, EMS messages, MMS messages and iMessages.

15. The device as recited in claim 8 wherein text-based message notifications are silenced when the device is in the driver mode.

16. The device as recited in claim 1 wherein, responsive to a first incoming text-based message from a subsequent message sender when the device is in the driver mode, the text-based message system automatically sends the driver mode reply message to the subsequent message sender; and wherein, responsive to subsequent incoming text-based messages from the subsequent message sender during the driver mode session, the text-based message system does not resend the driver mode reply message to the subsequent message sender.

17. The device as recited in claim 8 wherein, responsive to a first incoming text-based message from a subsequent message sender when the device is in the driver mode, the text-based message system automatically sends the driver mode reply message to the subsequent message sender; and wherein, responsive to subsequent incoming text-based messages from the subsequent message sender during the driver mode session, the text-based message system does not resend the driver mode reply message to the subsequent message sender.

18. The phone as recited in claim 11 wherein, responsive to a first incoming text-based message from a subsequent message sender when the device is in the driver mode, the text-based message system automatically sends the driver mode reply message to the subsequent message sender; and wherein, responsive to subsequent incoming text-based messages from the subsequent message sender during the driver mode session, the text-based message system does not resend the driver mode reply message to the subsequent message sender.

* * * * *